United States Patent Office 2,844,513

Patented July 22, 1958

1

2,844,513

PROCESS FOR SPLITTING RACEMATES

Albert Wettstein and Ernst Vischer, Basel, and Charles Meystre, Arlesheim, Switzerland, assignors to Ciba Pharmaceutical Products Inc., Summit, N. J.

No Drawing. Application July 18, 1956
Serial No. 598,542

Claims priority, application Switzerland July 20, 1955

12 Claims. (Cl. 195—3)

It is known to oxygenate or dehydrogenate with the aid of micro-organisms steroid compounds having a natural configuration, that is to say, to introduce hydroxyl or oxo groups or double bonds into these compounds, or convert hydroxyl groups into oxo groups.

The present invention is based on the unexpected observation that d,l-steroid compounds behave differently with respect to these micro-organisms in that substantially only the d-form, that is to say, the enantiomorphic form corresponding to the natural steroids, is oxidized, and the l-form remains unchanged. This observation has led to a new process for splitting racemates, in which there are obtained, in addition to the oxidized d-steroids, l-steroids of which only a few instances are known.

Accordingly, this invention provides a process for splitting d,l-steroids into their enantiomorphic forms, wherein d,l-steroids are subjected to the action of oxidizing enzymes produced by the aerobic culture of micro-organisms, and at least one of the enantiomorphic forms is isolated. Oxidizing enzymes are such as are capable either of introducing oxygen into the steroid or of removing hydrogen therefrom.

Suitable starting materials for the new process are in general saturated or unsaturated d,l-steroids substituted in any desired manner, for example, d,l-compounds of the cholestane, coprostane, cholane, spirostane, furostane, butanolide or cardanolide series, and especially those of the pregnane, androstane or testane series, and also their higher and lower homologues, for example corresponding A-nor-, D-homo- or 19-nor-compounds. Double bonds may be present, for example, in the 1- and/or 4-, 5-, 6-, 7-, 9-, 11-, 14-, 15, and/or 16-positions. As substituents there come into consideration free or functionally converted hydroxyl, oxo or carboxyl groups, such as ester, ether, thioester, thioether, thiol-ester and thion-ester, acetal, mercaptal, ketal, hydrazone, semicarbazone and enol groups, for example, in the 2-, 3-, 6-, 7-, 11-, 12-, 16-, 17-, 18-, 19-, 20- and 21-positions, and also halogen atoms, especially chlorine or fluorine, for example, in the 9- and 17-positions. The new process is of special interest as applied to d,l-pregnane compounds. Examples of starting materials of this series are, inter alia, d,l-progesterone, d,l-17α-progesterone, d,l-16α- hydroxy-progesterone, d,l-17α-hydroxyprogesterone, d,l-11-oxoprogesterone, d,l-11α- and -11β-hydroxy-progesterone, d,l-9:11- or 11:12-dehydroprogesterone, d,l-19-oxoprogesterone, d,l-11-oxo-17α-hydroxy-progesterone, d,l-11α- and 11β-hydroxy-17α-hydroxy-progesterone, d,l-9-chloro- or -9-fluoro-11β:17α-dihydroxy-progesterone, d,l-11β:18-dihydroxy-progesterone, d,l-11β:17:18-trihydroxy-progesterone, d,l-11β-hyroxy-18-oxo-progesterone, d,l-9-chloro- or -9-fluoro-11β-hydroxy-18-oxo-progesterone, d,l-11:18-dioxo-progesterone, d,l-19-nor-progesterone, d,l-19-nor-11β-hydroxy-18-oxo-progesterone, d,l-cortexone, d,l-18-hydroxy- and 18-oxo-cortexone, d,l-cortisone, d,l-hydrocortisone, d,l-17α-hydroxy-cortexone, d,l-aldosterone, d,l-pregnenolene, the corresponding 1-dehydro-compounds, for example, d,l-1-dehydroprogesterone, d,1-1-dehydro-17α-hydroxy-progesterone, d,1-1-dehydro-11-oxo, 11α-hydroxy- or 11β-hydroxy-progesterone, d,l-androstene-diol, d,l-17-methyl-androstenediol, d,l-dehydro-epi-androsterone or their functional derivatives. Especially important starting materials for the aldosterone synthesis are, for example, d,l-$\Delta^4$-3:20-dioxo-11β-hydroxy-pregnene-18-acid-lactone-(18→11), d,l-$\Delta^4$-3:18:20-trioxo-11β-hydroxypregnene or its 18:11-cyclo-semiacetal and d,l-$\Delta^4$-3:20-dioxo-11β:18-dihydroxy-pregnene. There may also be mentioned the corresponding compounds hydroxylated in the 17α-position.

The process is advantageously carried out by subjecting the starting material to the action of an aerobic culture of a single micro-organism.

Depending on the micro-organism used, there is obtained, for example, the d-steroid containing a hydroxyl group in the 6β-, 7α, 7β, 8-, 11α, 11β-, 14-, 15α-, 15β-, 16α-, 17α- or 21-position, or containing a double bond in the 1:2- and/or 4:5-positions or with a $\Delta^4$-3-keto- and/or 17-keto-grouping. Alternatively, the starting material may be subjected in one operation to the action of several cultures, it being of advantage to subject the starting material to the action of the individual cultures in succession.

There are suitable for the present process all aerobic cultures of micro-organisms which are capable of oxidizing steroid compounds, that is to say, introducing hydroxyl groups or double bonds or of converting hydroxyl groups into oxo groups. A few types of micro-organisms for use in the present process are given by way of example below:

6β-position:
- *Tichothecium roseum*
- *Lenzites abietina*
- *Rhizopus arrhizus*
- *Gliocladium catenulatum*
- *Gliocladium deliquescens*

7α-position:
- *Curvularia lunata*
- *Curvularia pallescens*
- *Curvularia falcata*
- *Curvularia fallax*
- Peziza spec.

7β-position:
- *Rhizopus arrhizus*
- *Proactinomyces roseus*

8-position
- *Curvularia pallescens*
- *Pleospora gaeumanni*
- *Helicostylum piriforme*

11α-position:
- *Rhizopus nigricans*
- *Rhizopus arrhizus*
- *Aspergillus niger*
- *Aspergillus ochraceus*
- *Penicillium notatum*
- *Penicillium adametzi*
- *Penicillium janthinellum*
- *Mucor mucedo*
- *Lenzites sepiaria*
- *Tilletia tritici*
- *Neurospora sitophila*
- *Neurospora crassa*

11β-position:
- *Curvularia lunata*
- *Curvularia pallescens*
- *Curvularia fallax*
- *Curvularia brachyspora*
- *Cunninghamella blakesleeana*
- *Streptomyces fradiae*
- *Stigmina platani*

14-position:

- *Sclerophoma entoxylina*
- *Parasitella simplex*
- *Helicostylum piriforme*
- *Mucor griseocyanus*
- *Mucor parasiticus*

15α-position:

- *Gibberella baccata*
- *Nectria cinnabarina*
- *Hormodendrum viride*

15β-position:

- *Lenzites abietina*
- Spicaria

16α-position:

- *Didymella vodakii*
- Actinomycetes ETH A 6246, A 7746, A 7747, A 7451, A 7486

17α-position:

- *Trichothecium roseum*
- *Cephalothecium roseum*
- *Cucurbitaria laburni*
- *Leptosphaeria maculans*
- *Trichoderma lignorum*
- *Trichoderma glaucum*
- *Acrospeira levis*
- *Lophotrichus hartinii*
- *Melanospora parasitica*
- *Thielavia terricola*
- *Dactylium dendroides*

21-position:

- *Ophiobolus herpotrichus*
- *Sclerotinia fructicola*
- *Wojnowicia graminis*
- *Hendersonia rubi*
- *Hendersonia abietus*
- Dilophosphora spec.
- *Phoma hibernica*
- *Septoria aesculi*
- *Aspergillus niger*

1:2-dehydration:

- *Fusarium solani*
- *Fusarium caucasicum*
- *Calonectria decora*
- *Alternaria passiflorae*
- *Ophiobolus heterostrophus*
- *Ophiobolus miyabeanus*
- *Didymella lycopersici*
- *Corynebacterium simplex*
- *Bacillus sphaericus*
- *Bacillus subtilis*
- Mycobacteria 3 and/or 17-position:

- *Proactinomyces erythorpolis*
- *Proactinomyces aquosus*
- *Proactinomyces restrictus*
- *Proactinomyces roseus*
- Azotobacter
- Mycobacteria
- *Micrococcus dehydrogenans*
- *Corynebacterium mediolanum*
- *Alcaligenes faecalis*
- Yeast and oxidizing bacteria
- Pseudomonas
- *Flavobacterium androstenedionicum*
- *Flavobacterium carbonilicum*
- *Actinomyces albus*
- *Aspergillus niger*
- *Phycomyces blakesleeana*
- *Penicillium chrysogenum*

As will be seen from the foregoing list, the aforesaid micro-organisms are bacteria Actinomycetes or moulds and belong, for example, to the classes of Phycomycetes, Ascomycetes, Basidiomycetes or Fungi imperfecti.

In carrying out the process the starting materials may be incubated in known manner under aerobic conditions with the cultures of the aforesaid micro-organisms. The growth may be carried out as a surface culture or, which is technically preferable, as a submerged culture, with agitation or stirring. The culture media contain assimilable carbon, especially carbohydrates, and if desired, growth promoting substances, for example, corn steep liquor or beer wort, and inorganic salts. Thus there may be used natural, synthetic or semi-synthetic nutrient solutions. The simplest way of carrying out the process may be illustrated as follows without limiting the invention thereof: The organisms are cultivated in apparatus and under conditions known in the production of antibiotics as the so-called deep tank process. After the culture has developed, a starting material of the kind defined above is added in the form of a fine dispersion or solution, for example, in methanol, acetone or ethylene glycol, and incubation is continued. Finally the filtrate and/or the mycelium mass is extracted, and the d-steroid and/or the l-steroid is isolated in known manner from the extract, for example, by a demixing method, adsorption, chromatography, crystallization, conversion into functional derivatives such as Girard compounds, or the like. The same reactions can also be carried out by first separating the active enzymes from the aerobic cultures of the appropriate organisms and using them apart from the growing cultures. Thus, for example, the mycelia formed by the aerobic cultivation of the appropriate organisms are separated, suspended in water or buffer solutions, the appropriate starting materials are added to the suspensions and the latter are incubated.

When several micro-organisms are to be used in a single operation, the process may be carried out as follows: After developing the culture of the first organism, the starting material is added in fine suspension or in solution, for example, in methanol, acetone, or ethylene glycol, and incubation is continued until the maximum reaction has taken place. Then, without previous filtration or isolation of the oxidation product, a fully developed culture of the second organism and if necessary, the appropriate nutrient substances and growth promoting substances are added to the reaction mixture, and the incubation is continued. If desired, this operation may be repeated with a third micro-organism. The progress of the individual oxidations can be observed by paper chromatography.

The products of the process can be used as medicaments or as intermediate products for making medicaments. The new process is especially valuable in the aldosterone synthesis. Thus, for example, by the action of an aerobic culture of *Ophiobolus herpotrichus* on d: l-$\Delta^4$-3:18:20-trioxo-11β-hydroxy-pregnene or its 18:11-cyclo-semiacetal in a single stage d-aldosterone is obtained in good yield. When using a purely chemical process about 7 steps are required for this synthesis, using the same starting material.

Generally speaking, the splitting of racemates by the new process is especially simple, because the hydroxylated or dehydrogenated derivatives of the one antipode can easily be separated from the other unchanged antipode owing to their higher polarity.

Since the classical investigations of Pasteur, a microbiological method for isolating the one antipode from racemates has occasionally been used. Moulds or bacteria have usually been used which assimilate the starting materials, the natural (d) antipodes being assimilated more rapidly than the non-natural (l) antipodes. In this method, therefore, in order to obtain an optically pure product the microbiological treatment is continued until at least one form and generally the biologically more interesting form, is completely destroyed. Accordingly, the new process, even when the reaction is incomplete, yields the converted antipode, which is generally the biologically more interesting antipode, in an optically pure form and in the form of a derivative which is of practical value in itself or for purposes of further synthesis, and the process reduces the number of chemical conversions. If, in the new process one of the antipodes is completely reacted, the other antipode is also obtained in an optically pure form.

The following examples illustrate the invention:

*Example 1*

In 5 Erlenmeyer flasks of 500 cc. capacity are sterilized 5 portions each of 120 cc. of aqueous beer wort of 70 percent strength and the liquors are inoculated with *Ophiobolus herpotrichus*. The flasks are agitated at 27° C. After 4 days there is added to each of the well developed cultures under sterile conditions a solution of 30 milligrams of d:l-progesterone in 1.5 cc. of acetone, and shaking is continued at the same temperature. After 4 days the mycelia are separated off and washed with water and ethyl acetate. The combined filtrates are extracted 4 times with 200 cc. of ethyl acetate on each occasion. The combined extracts are washed with water, dried and evaporated. The residue (160 milligrams) contains, as determined by paper chromatography approximately equal quantities of two compounds which behave like cortexone (11-desoxycorticosterone) and progesterone, respectively. Separation is carried out by means of a preparative paper chromatogram using the system Bush B3. The zones corresponding to cortexone are cut out and elutriated with 400 cc. of methanol of 50 percent strength. The methanol is then removed in vacuo. The residual aqueous solution is agitated 4 times with 50 cc. of chloroform on each occasion and the combined extracts are washed with water, dried and evaporated in vacuo. The residue is crystallized from a mixture of acetone and ether, whereby d-cortexone melting at 140–143° C. is obtained in pure form. It has the specific rotation $[\alpha]_D=+180°$ (ethanol). The zones of the preparative paper chromatogram corresponding to progesterone are treated in a similar manner. There are obtained 92 milligams of crude extract, from which pure l-progesterone is obtained by repeated crystallization from mixtures of acetone and petroleum ether. The product melts at 122–125° C., and has the specific rotation $[\alpha]_D=-190°$ (acetone).

*Example 2*

In a shaking vessel 500 cc. of sterile beer wort are inoculated with *Cunninghamella blakesleeana*, and the whole is agitated for 3 days at 27° C. There is then added to the well developed culture under sterile conditions a solution of 150 milligrams of d:l-cortexone in 8 cc. of acetone. In a second vessel 500 cc. of sterile beer wort is inoculated at the same time with *Trichothecium roseum*. Both cultures are agitated for 3 days at 27° C., and then they are combined under sterile conditions, and then further agitated at the same temperature. After 3 days the mycelium is separated off and washed with water and ethyl acetate. The combined filtrates are extracted as described in Example 1. The residue obtained (165 milligrams) consists, as determined by paper chromatography, mainly of three compounds which correspond to cortexone, hydrocortisone and cortisone. The residue is chromatographed over 8 grams of silica gel by fractional elutriation, first with chloroform, then with a mixture of chloroform and acetone (99:1) and finally with a mixture of chloroform and acetone (1:1). The individual fractions (each of 20 cc.) are examined by paper chromatography. The constituents elutriated with chloroform contain impurities, whereas a compound corresponding to cortexone is present in the chloroform-acetone (99:1)-fractions. The fractions are combined and evaporated. By crystallization from mixtures of acetone and ether l-cortexone is obtained. It melts at 138–142° C. and has the specific rotation $[\alpha]_D=-175°$ (ethanol).

The further constituents elutriated with chloroform-acetone (1:1) consist mainly of d-hydrocortisone and d-cortisone. These portions are combined, evaporated and separation is carried out by a preparative paper chromatogram (system propylene glycol toluene). The paper zones containing the d-hydrocortisone and the d-cortisone are worked up separately as described in Example 1. By crystallizing each of the two extraction residues from mixtures of acetone and isopropyl ether there is obtained d-hydrocortisone melting at 205–210° C., and having the specific rotation $[\alpha]_D=+165°$ (ethanol) and d-cortisone melting at 210–216° C. and having the specific rotation $[\alpha]_D=+195°$ (dioxane).

*Example 3*

In an agitating vessel 1 gram of sodium nitrate, 0.5 gram of primary potassium ortho-phosphate, 0.25 gram of magnesium sulfate heptahydrate, 0.25 gram of potassium chloride, 25 grams of crude glucose and 0.5 gram of Difco-yeast extract are dissolved in 500 cc. of tap water, the pH value of the solution is adjusted to 5 and the solution is sterilized. This nutrient solution is inoculated with *Didymella lycopersici* and agitated for 3 days at 27° C. There is then added under sterile conditions a solution of 120 milligrams of d:l-cortisone in 5 cc. of methanol. The whole is agitated for a further 4 days at 27° C., then the mycelium is filtered off with suction and washed with water and ethyl acetate. The combined filtrates are extracted as described in Example 1. The extraction residue consists, as determined by paper chromatography, of a product behaving like the starting materials and of 1-dehydrocortisone. The mixture is split up by preparative paper chromatography (system propylene glycol-toluene). By recrystallization from acetone there is obtained d-1-dehydrocortisone melting at 231–234° C. and having the specific rotation $[\alpha]_D=+170°$ (in dioxane). By repeated recrystallization from a mixture of acetone and isopropyl ether pure l-cortisone is obtained melting at 211–217° C. and having the specific rotation $[\alpha]_D=-190°$ (dioxane).

*Example 4*

A nutrient solution is prepared which contains, in 1 liter of tap water, 20 grams of peptone, 5 cc. of corn steep liquor and 10 grams of crude glucose and its pH value is adjusted to 6.3. Portions of 120 cc. each of this solution are sterilized in four Erlenmeyer flasks of 500 cc. capacity and inoculated with *Wojnowicia graminis*. The cultures are agitated at 27° C. for four days, and then there are added under sterile conditions solutions each consisting of 30 milligrams of the $(18\rightarrow 11\beta)$-lactone of d:l-$\Delta^4$-3:20-dioxo-11β-hydroxy-pregnene-18-acid in 1.5 cc. of methanol. Then agitation is continued at the same temperature. After 8 days the mycelium is separated off, washed with water and ethyl acetate, and the combined filtrates are extracted as described in Example 1. The extraction residue (140 milligrams) contains, as determined by paperchromatography, a product similar to the starting material and also the $(18\rightarrow 11\beta)$-lactone of $\Delta^4$-3:20-dioxo-11β:21-dihydroxy-pregnene-18-acid. Splitting up is carried out by preparative paper chromatography (system formamide-benzene-chloroform). The two components are elutriated from the paper in the manner described in Example 1 and extracted. By crystallization from a mixture of acetone and ether there is obtained the $(18\rightarrow 11\beta)$-lactone of d-$\Delta^4$-3:20-dioxo-11β:21-dihydroxy-pregnene-18-acid melting at 205–222° C. and having the specific rotation $[\alpha]_D=+117°$ (acetone).

*Example 5*

Four Erlenmeyer flasks are charged each with 120 cc. of the nutrient solution described in Example 4 and the solutions are sterilized. The solutions are inoculated with *Ophiobolus herpotrichus*, and the cultures are agitated for 5 days at 27° C. There is then added to each culture under sterile conditions a solution of 30 milligrams of d:l-3:18:20-trioxo-11β-hydroxy-pregnene or its 18:11-cyclo-semi-acetal in 1.5 cc. of methanol, and the cultures are further agitated at the same temperature. After 10 days the mycelium is separated off, washed with water and ethyl acetate, and the combined filtrates are extracted as described in Example 1. The extraction residue contains, in addition to a product resembling the starting material, a compound corresponding with aldosterone. The latter is purified by preparative paper chromatography (system Bush C), the elutriation and extraction being carried out as described in Example 1. By recrystallization from a mixture of acetone and ether there is obtained crystalline d-aldosterone melting at 162–168° C. and having the specific rotation $[\alpha]_D=+142°$ (acetone).

*Example 6*

300 cc. of the nutrient solution described in Example 4 are sterilized in a shaking vessel and inoculated with *Wojnowicia graminis*. After agitating for 4 days the culture will have developed well, and there is added under sterile conditions a solution of 50 milligrams of d:l-$\Delta^4$-3:18:20-trioxo-11β-hydroxy-pregnene or its 18:11-cyclo-semi-acetal in 3 cc. of methanol. At the same time 300 cc. of sterilized beer wort in a second agitating vessel are inoculated with *Trichothecium roseum*. Both cultures are agitated for 4 days at 27° C., and they are then united under sterile conditions and further agitated at the same temperature. After 4 days the mycelium is separated off and washed with water and ethyl acetate. The combined filtrates are extracted in a manner described in Example 1. The extraction residue (55 milligrams) contains, in addition to a compound behaving like the starting material, d-17α-hydroxy-aldosterone. The latter is obtained in a unitary condition by preparative paper chromatography (system propylene glycol-toluene), the elutriation and extraction of the papers being carried out as described in Example 1.

*Example 7*

300 cc. of beer wort are sterilized in a shaking vessel and inoculated with *Trichothecium roseum*. The culture is agitated for 4 days at 27° C., and then there is added under sterile conditions a solution of 60 milligrams of d:l-aldosterone in 3 cc. of methanol. The whole is agitated for a further 4 days at 27° C., the mycelium is separated off and washed with water and ethyl acetate. The combined filtrates are extracted in the manner described in Example 1. The extraction residue which contains d-17α-hydroxy-aldosterone, in addition to starting material is split up by preparative paper chromatography (system Bush C). d-17α-hydroxy-aldosterone is obtained in a unitary form by elutriating the corresponding zones of the papers as described in Example 1. It is crystallized from a mixture of acetone and ether. From the zones corresponding to the starting material l-aldosterone is obtained by crystallization from a mixture of ether and acetone. It melts 162–168° C. and has the specific rotation $[\alpha]_D=-142°$ (acetone).

*Example 8*

300 cc. of sterile beer wort in an agitating vessel are inoculated with *Ophiobolus herpotrichus* and agitated at 27° C. After 5 days, there is added under sterile conditions a solution of 60 milligrams of d:l-$\Delta^4$-3:20-dioxo-11β:18-dihydroxy-pregnene in 4 cc. of methanol, and agitation is continued at the same temperature. After 6 days the mycelium is separated off and washed with water and ethyl acetate. The combined filtrates are extracted as described in Example 1. The extraction residue consists, as determined by paper chromatography, of a compound resembling the starting material and also of d-$\Delta^4$-3:20-dioxo-11β:18:21-trihydroxy-pregnene, which is separated by preparative paper chromatography (system propylene glycol-toluene). The d-$\Delta^4$-3:20-dioxo-11β:18:21-trihydroxy-pregnene is crystallized from a mixture of acetone and ether.

*Example 9*

In an agitating vessel 200 cc. of a nutrient solution is prepared which contains to 1 liter of tap water, 10 grams of crude glucose, 5 grams of peptone, 3 grams of meat extract (Oxo Lab. Lemco), 5 grams of sodium chloride and 10 grams of calcium carbonate, and its pH value is adjusted to 7.5. The solution is sterilized and inoculated with a culture of a strain of *Streptomyces albus*. It is agitated for 2 days at 27° C. and then a solution of 50 milligrams of d,l-α-estradiol in 2 cc. of dioxane is added under sterile conditions. Agitation is continued for another 3 days at 27° C., the mycelium is separated off and the culture filtrate is extracted with methylene chloride. The extraction residue consists of compounds corresponding to α-estradiol and estrone as determined by paper chromatography. The mixture is separated by means of preparative paper chromatography, and by crystallization from aqueous methanol there is obtained on the one hand l-α-estradiol melting at 175–178° C. and having the specific rotation $[\alpha]_D=-81°$, and on the other d-estrone melting at 257–259° C. and having the specific rotation $[\alpha]_D=+161°$.

*Example 10*

To 200 cc. of a well developed agitated culture of Pseudomonas there is added under sterile conditions a solution of 50 milligrams of d,l-androsterone in 2 cc. of dioxane. The mixture is agitated for 48 hours at 27° C. and the culture is then extracted with methylene chloride. The extraction residue, as determined by paper chromatography, behaves like androsterone and 3,17-diketo-androstane. It is split up by means of preparative paper chromatography and there are obtained by crystallization from aqueous methanol l-androsterone melting at 180–182° C. having the specific rotation $[\alpha]_D=-92°$, and d-3,17-diketo-androstane melting at 130–132° C. having the specific rotation $[\alpha]_D=+109°$.

*Example 11*

To 200 cc. of a well developed agitated culture of a strain of *Streptomyces fradiae* there is added under sterile conditions a solution of 50 milligrams of d,l-pregnenolone in 2 cc. of acetone. The mixture is agitated for 24 hours at 27° C., and the culture is then extracted with methylene chloride. The extraction residue, as determined by paper chromatography, behaves like pregnenolone and progesterone. It is split up by means of preparative paper chromatography and by crystallization from mixtures of acetone and petroleum ether there are obtained l-pregnenolone melting at 187–189° C. having the specific rotation $[\alpha]_D=-25°$, and d-progesterone melting at 125–127° C. having the specific rotation $[\alpha]_D=+190°$ C.

*Example 12*

If in the above example for the reaction of d,l-pregnenolone, a culture of the strain of *Aspergillus niger* is used instead of *Streptomyces fradiae*, and incubation and working up are carried out in the manner described, l-pregnenolone melting at 185–188° C. having the specific rotation $[\alpha]_D=-23°$ and d-progesterone melting at 123–126° C. having the specific rotation $[\alpha]_D=+191°$ can be isolated.

*Example 13*

A nutrient solution is prepared which contains to 1 liter of tap water, 2.6 grams of tartaric acid, 2.6 grams of ammonium tartrate, 0.17 gram of ammonium sulfate, 0.4 gram of secondary ammonium phosphate, 0.4 gram of potassium carbonate, 0.27 gram of magnesium carbonate, 50 grams of glucose and 1 gram of yeast extract (Difco), and its pH is adjusted to 5.0. 120 cc. of this solution are sterilized in an Erlenmeyer flask, inoculated with *Rhizopus nigricans* and agitated at 27° C. After two days a solution of 30 milligrams of d,l-progesterone in 1.5 cc. of acetone is added under sterile conditions and the whole is agitated for another two days at 27° C. The mycelium is then separated off, washed with water and ethyl acetate. The combined filtrates are extracted five times with ethyl acetate, the extracts washed with water, dried and evaporated. Examination by paper chromatography of the extraction residue shows that it consists of about equal parts of compounds corresponding to progesterone and 11α-hydroxy-progesterone. The mixture is split up by means of paper chromatography, and by recrystallization from mixtures of acetone and petroleum ether there are obtained l-progesterone melting at 118–120° C. having the specific rotation $[\alpha]_D=-187°$ (in dioxane) and d-11α-hydroxy-progesterone melting at 169–171° C. having the specific rotation $[\alpha]_D=+176°$ (in chloroform).

*Example 14*

A nutrient solution is prepared which contains to 1 liter of tap water, 10 grams of cane sugar, 10 grams of Difco-Trypton, 2 grams of sodium nitrate, 1 gram of secondary potassium phosphate, 0.5 gram of magnesium sulfate, 0.5 gram of potassium chloride and 10 milligrams of ferrosulfate heptahydrate, and its pH value is adjusted to 7.0. 2.5 grams of calcium carbonate are then added. 120 cc. of this solution are sterilized in an Erlenmeyer flask, inoculated with *Curvularia lunata* and agitated at 27° C. After two days the mycelium is separated off, washed with a little water and suspended in 120 cc. of distilled water. To this suspension there is added a solution of 30 milligrams of d,l-cortexone in 1.5 cc. of acetone and the mixture is agitated for 30 hours at 27° C. The mixture is then extracted four times with ethyl acetate. The extracts are washed with water, dried and evaporated. The extraction residue, as determined by paper chromatography, consists mainly of two substances which correspond to cortexone and corticosterone. By means of preparative paper chromatography and crystallization from mixtures of acetone and petroleum ether there are obtained l-cortexone melting at 138–141° C. having the specific rotation $[\alpha]_D=-175°$ (in absolute alcohol) and d-corticosterone melting at 178–181° C. having the specific rotation $[\alpha]_D=+220°$ (in absolute alcohol).

*Example 15*

If a solution of 30 milligrams of d,l-17α-hydroxy-cortexone in 1.5 cc. of methanol is added to a mycelium suspension of *Curvularia lunata* in 120 cc. of distilled water, obtained as described in the above example, and after agitating for two days at 27° C. working up is carried out as described, the extraction residue, as determined by paper chromatography, contains mainly two substances which correspond to 17α-hydroxy-cortexone and 17α-hydroxy-corticosterone. The mixture is split up by means of preparative paper chromatography, and there are obtained l-17α-hydroxy-cortexone melting at 210–214° C. having the specific rotation $[\alpha]_D=-140°$ (in absolute alcohol) and d-17α-hydroxy-corticosterone (d-hydrocortisone) melting at 209–212° C., having the specific rotation $[\alpha]_D=-171°$ (in absolute alcohol).

*Example 16*

In an agitating vessel 1 gram of sodium nitrate, 0.5 gram of primary potassium ortho-phosphate, 0.25 gram of potassium chloride, 25 grams of crude glucose and 0.5 gram of Difco-yeast extract are dissolved in 500 cc. of tap water, the pH value of the solution is adjusted to 5 and the solution is sterilized. This nutrient solution is inoculated with *Didymella lycopersici* and agitated for 3 days at 27° C. There is then added under sterile conditions a solution of 120 milligrams of d,l-17α-hydroxy-corticosterone in 5 cc. of methanol. The whole is agitated for a further 4 days at 27° C., then the mycelium is filtered off with suction and washed with water and ethyl acetate. The combined filtrates are extracted as described in Example 13. The extraction consists, as determined by paper chromatography, of a product behaving like the starting material and 1-dehydro-17α-hydroxy-corticosterone. The mixture is split up by preparative paper chromatography (system propylene glycol-toluene). By recrystallization from acetone there are obtained d-1-dhydro-17α-hydroxy-corticosterone melting at 234–236° C. and having the specific rotation $[\alpha]_D=+98°$ (in dioxane) and l-17α-hydroxy-corticosterone melting at 208–210° C. and having the specific rotation $[\alpha]_D=-168°$ (in absolute alcohol).

*Example 17*

A culture of *Didymella lycopersici* is prepared as described in the previous example and a solution of 120 milligrams of d,l-17α-hydroxy-corticosterone-21-trimethyl actate in 5 cc. of acetone is added. After agitating for 4 days at 27° C., the mixture is worked up in the same manner. The extraction residue, as determined by paper chromatography, consists mainly of 2 products behaving like the starting material and 1-dehydro-17α-hydroxy-corticosterone-trimethyl acetate respectively. The mixture is split up by means of preparative paper chromatography, and by crystallization from ethyl acetate there are obtained l-17α-hydroxy-corticosterone-21-trimethyl acetate melting at 231–232° C. and having the specific rotation $[\alpha]_D=-145°$ (in dioxane) and d-1-dehydro-17α-hydroxy-corticosterone-21-trimethyl acetate melting at 233–236° C. and having the specific rotation $[\alpha]_D=+103°$ (in chloroform).

*Example 18*

120 cc. of the nutrient solution described in Example 16 are inoculated with *Didymella lycopersici* and agitated for 2 days at 27° C. A solution of 30 milligrams of d,l-aldosterone in 1.5 cc. of acetone is then added under sterile conditions and agitation is continued at the same temperature. After three days the mycelium is separated off and washed with water and ethyl acetate. The combined filtrates are extracted as described in Example 13. The extraction residue, as determined by paper chromatography, consists of a product behaving like aldosterone and of 1-dehydro-aldosterone. The two substances are separated by means of preparative paper chromatography (system Bush C) and crystallized from a mixture of acetone and ether. There are obtained l-aldosterone melting at 110° C./158–165° C. and having the specific rotation $[\alpha]_D=-141°$ (acetone) and d-1-dehydro-aldosterone (infra red bands in chloroform inter alia at 2.82μ, 2.95μ, 5.87μ, 6.10μ, 6.17μ 6.24μ, 6.91μ, 7.15μ, 7.31μ, 7.77μ, 9.42μ, 10.68μ and 11.28μ).

D-1-dehydro-aldosterone is acetylated in the usual manner with pyridine and acetic anhydride. A mixture of two products is obtained which show in the paper chromatogram with the system propylene glycol-toluene $R_F$-values of 0.70 and 0.15 and are d-1-dehydro aldosterone-18;21-diacetate and d-1-dehydro-aldosterone-21-monoacetate. The latter is obtained in pure crystalline form when the crude mixture is treated with absolute ether. Melting point=182–185° C., it exhibits infra-red bands in methylene chloride inter alia at 2.81μ, 5.74μ, 6.01μ 6.16μ, 6.23μ, 7.31μ, 8.17μ, 8.93μ, 8.82μ, 9.72μ, 10.03μ, 10.62μ, 11.32μ and 12.29μ.

*Example 19*

120 cc. of a culture of *Didymella lycopersici* are prepared as described in Example 16. A solution of 25 milligrams of d,l-cortisone in 1.5 cc. of methanol is added under sterile conditions. The mixture is agitated for 3 days at 27° C. and the mycelium separated off. It is washed with water and ethyl acetate. The combined filtrates are extracted as described in Example 13. The extraction residue, as determined by paper chromatography, consist of 1-dehydro-cortisone and of a product which behaves like cortisone. These two substances are separated by means of preparative paper chromatography. There are obtained d-1-dehydro-cortisone melting at 231–234° C. and having the specific rotation $[\alpha]_D=+169°$ (dioxane) and l-cortisone melting at 215° C. and having the specific rotation $[\alpha]_D=-201°$ (dioxane).

*Example 20*

120 cc. of a sterilized Czapek-Dox nutrient solution are inoculated with a culture of *Trichothecium roseum* and agitated for 5 days at 27° C. A solution of 30 milligrams of d,l-aldosterone in 1.5 cc. of acetone is added under sterile conditions and agitation is continued at the same temperature. After four days the mycelium is separated off and washed with water and ethyl acetate. The combined filtrates are extracted as described in Example 13. The extraction residue, as determined by paper chromatography, consists mainly of a product behaving like aldosterone and of 17α-hydroxy-aldosterone. The two substances are separated by means of preparative paper chromatography (system Bush C). There are obtained l-aldosterone and d-17α-hydroxy-aldosterone.

*Example 21*

120 cc. of sterile beer wort are inoculated with a culture of *Ophiobolus herpotrichus* and agitated for 3 days at 27° C. A solution of 40 milligrams of d,l-Δ⁴-3:20-diketo-11β-hydroxy-pregnene-18-acid-lactone (18→11β) in 1.5 cc. of acetone is added under sterile conditions and agitation is continued at 27° C. After 6 days the mycelium is separated off and washed with water and ethyl acetate. The combined filtrates are extracted as described in Example 13. The extraction residue, as determined by paper chromatography, consists of a product behaving like the starting material and of Δ⁴-3:20-diketo-11β:21-dihydroxy-pregnene-18-acid-lactone-(18→11β). The two substances are separated by means of paper chromatography and there are obtained l-Δ⁴-3:20-diketo-11β-hydroxy-pregnene-18-acid-lactone-(18→11β) having the specific rotation $[\alpha]_D=-154°$ and d-Δ⁴-3:20-diketo-11β:21-dihydroxy-pregnen-18-acid-lactone-(18→11β) having the specific rotation $[\alpha]_D=+117°$.

*Example 22*

120 cc. of sterile beerwort are inoculated with a culture of *Ophiobolus herpotrichus* and agitated for 3 days at 27° C. A solution of 40 milligram of d,l-Δ⁴-3:18:20-trioxo-11β-hydroxy-pregnene or its 18:11-cyclosemiacetal in 1.5 cc. of acetone is added under sterile conditions and agitation is continued at 27° C. After 6 days the mycelium is separated and washed with water and ethyl acetate. The combined filtrates are extracted as described in Example 13. The extraction residue, as determined by paper chromatography, consists of a product behaving like the starting material and of aldosterone. The two substances are separated by means of preparative paper chromatography and there are obtained l-Δ⁴-3:18:20-trioxo-11β-hydroxy-pregnene or its 18:11-cyclosemiacetal and d-aldosterone having the specific rotation $[\alpha]_D=+142°$.

The starting material used can be prepared as described in the process of application Serial No. 585,142, filed May 16, 1956, by Tadeus Reichstein et al.

*Example 23*

120 cc. of sterile beerwort are inoculated with a culture of *Ophiobolus herpotrichus* and agitated for 3 days at 27° C. A solution of 40 milligrams of d,l-19-nor-progesterone in 1.5 cc. of acetone is added under sterile conditions and agitation is continued at 27° C. After three days the mycelium is separated and washed with water and ethyl acetate. The combined filtrates are extracted as described in Example 13. The extraction residue, as determined by paper chromatography, consists of a product behaving like the starting material and of 19-nor-cortexone. The two substances are separated by means of preparative paper chromatography and there are obtained l-19-nor-progesterone having the specific rotation $[\alpha]_D=-143°$ and d-19-nor-cortexone. The latter is acetylated in the usual manner with the aid of pyridine and acetic anhydride. The 21-acetate has a specific rotation $[\alpha]_D=+145°$.

*Example 24*

120 cc. of sterile beerwort are inoculated with a culture of *Ophiobolus herpotrichus* and agitated for 3 days at 27° C. A solution of 40 milligrams of d,l-9α-fluoro-11β-hydroxy-progesterone in 1.5 cc. of acetone is added under sterile conditions and agitation is continued at 27° C. After 4 days of mycelium is separated and washed with water and ethyl acetate. The combined filtrates are extracted as described in Example 13. The extraction residue, as determined by paper chromatography, consists of a product behaving like the starting material and of 9α-fluoro-corticosterone. The two substances are separated by means of paper chromatography and there are obtained l-9α-fluoro-11β-hydroxy-progesterone having the specific rotation $[\alpha]_D=-190°$ and d-9α-fluoro-corticosterone. The latter is acetylated in the usual manner with the aid of pyridine and acetic anhydride. The 21-monoacetate has a specific rotation $[\alpha]_D=+187°$.

*Example 25*

120 cc. of sterile beerwort are inoculated with a culture of Rhizopus species and agitated for 3 days at 27° C. A solution of 30 milligrams of d,l-cortexone (11-desoxy-corticosterone) in 1.5 cc. of acetone is added under sterile conditions and agitation is continued at 27° C. After 4 days the mycelium is separated and the culture filtrate extracted as described in the preceding examples. The extraction residue, as determined by paper chromatography, consists mainly of a product behaving like the starting material and of 6β-hydroxy-cortexone. The two substances are separated by means of preparative paper chromatography. There are obtained l-cortexone having the specific rotation $[\alpha]_D=-175°$ and d-6β-hydroxy-cortexone having the specific rotation $[\alpha]_D=+100°$.

*Example 26*

120 cc. of sterile beerwort are inoculated with a culture of Peziza sp ETH M 26 and agitated for 3 days at 27° C. A solution of 30 milligrams of d-l-cortexone (11-desoxy-corticosterone) in 1.5 cc. of acetone is added under sterile conditions and agitation is continued at 27° C. After 4 days the mycelium is separated and the culture filtrate extracted as described in the preceding examples. The extraction residue, as determined by paper chromatography, consists mainly of a product behaving like the starting material and of 7 -hydroxy-cortexone. The two substances are separated by means of preparative paper chromatography. There are obtained l-cortexone having the specific rotation $[\alpha]_D=-173°$ and d-7α-hydroxy-cortexone having the specific rotation $[\alpha]_D=+155°$.

*Example 27*

120 cc. of sterile beerwort are inoculated with a culture of *Lenzites abietina* and agitated for 3 days at 27° C. A solution of 30 milligrams of d,l-cortexone (11-desoxy-corticosterone) in 1.5 cc. of acetone is added under sterile conditions and agitation continued at 27° C. After 4 days the mycelium is separated and the culture filtrate extracted as described in the preceding examples. The extraction residue, as determined by paper chromatography, consists mainly of a product behaving like the starting material and of 15β-hydroxy-cortexone. The two substances are separated by means of preparative paper chromatography. There are obtained l-cortexone having the specific rotation $[\alpha]_D = -170°$ and d-15β-hydroxy-cortexone having the specific rotation $$[\alpha]_D = +141°$$

*Example 28*

120 cc. of sterile Czapek-Dox nutrient solution are inoculated with a culture of *Gibberella baccata* and agitated for 3 days at 27° C. A solution of 30 milligrams of d,l-cortexone (11-desoxy-corticosterone) in 1.5 cc. of acetone is added under sterile conditions and agitation continued at 27° C. After 4 days the mycelium is separated and the culture filtrate extracted as described in the preceding examples. The extraction residue, as determined by paper chromatography, consists mainly of a product behaving like the starting material and of 15α-hydroxy-cortexone. The two substances are separated by means of preparative paper chromatography. There are obtained l-cortexone having the specific rotation $[\alpha]_D = -169°$ and a d-15α-hydroxy-cortexone having the specific rotation $[\alpha]_D = +195°$.

*Example 29*

120 cc. of sterile beerwort are inoculated with a culture of *Pleospora gaeumanni* and agitated for 3 days at 27° C. A solution of 30 milligrams of d,l-cortexone (11-desoxy-corticosterone) in 1.5 cc. of acetone is added under sterile conditions and agitation continued at 27° C. After 4 days the mycelium is separated and the culture filtrate extracted as described in the preceding examples. The extraction residue, as determined by paper chromatography, consists mainly of a product behaving like the starting material and of 14α-hydroxy-cortexone. The two substances are separated by means of preparative paper chromatography. There are obtained l-cortexone having the specific rotation $[\alpha]_D = -174°$ and d-14α-hydroxy-cortexone having the specific rotation $[\alpha]_D = +179°$.

*Example 30*

120 cc. of a nutrient solution which contains to 1 liter of tap water, 10 grams of crude glucose, 5 grams of peptone, 5 grams of NaCl, 3 grams of meat extract (Oxo Lab. Lemco) and 10 grams of $CaCO_3$ and the pH value being adjusted to 7.5 with dilute NaOH, are sterilized and inoculated with a culture of the Streptomyces strain No. 7747 (Institut für Spezielle Botanik, ETH Zurich). The mixture is agitated for 2 days at 27° C. and then a solution of 30 milligrams of d,l-cortexone in 1.5 cc. of acetone is added under sterile conditions. Agitation is continued at the same temperature and after 2 days the mycelium is separated off. The culture filtrate is extracted as described in Example 13. The extraction residue, as determined by paper chromatography, consists of a product behaving like the starting material and of 16α-hydroxy-cortexone. The two substances are separated by means of preparative paper chromatography. There are obtained l-cortexone having the specific rotation $[\alpha]_D = -171°$ and d-16α-hydroxy-cortexone having the specific rotation $[\alpha]_D = +114°$.

The starting materials to be used according to the process can be made by methods in themselves known starting from totally synthetically accessible tetracyclic intermediate products, e. g. of the cholestane, pregnane or testane series.

What is claimed is:

1. Process for splitting racemates of d,l-steroids, wherein a d,l-steroid is subjected to the action of oxidizing enat least one of the positions 6, 7, 11, 15 and 16 so as to as to oxidize only the d-form and separating the resulting oxidized d-form and the unoxidized l-form.

2. Process for splitting racemates of d,l-steroids, wherein a d,l-steroid is subjected to the action of hydroxylating enzymes produced by aerobic cultures of micro-organisms so as to hydroxylate only the d-form and separating the resulting hydroxylated d-form and the non-hydroxylated l-form.

3. Process for splitting racemates of d,l-steroids, wherein a d,l-steroid is subjected to the action of dehydrogenating enzymes produced by aerobic cultures of micro-organisms so as to dehydrogenate only the d-form and separating the resulting dehydrogenated d-form and the non-hydrogenated l-form.

4. Process for splitting racemates of d,l-steroids, wherein a d,l-steroid is subjected to the action of hydroxylating enzymes which are capable of introducing hydroxyl groups into at least one of the positions 6, 7, 8, 11, 14, 15, 16, 17 and 21 so as to hydroxylate only the d-form and separating the resulting hydroxylated d-form and the non-hydroxylated l-form.

5. Process for splitting racemates of d,l-steroids, wherein a d,l-steroid is subjected to the action of oxidizing enzymes produced by aerobic cultures of micro-organisms which are capable of introducing oxo groups into at least one of the positions 6, 7, 11, 15 and 16 so as to oxidize only the d-form and separating the resulting oxidized d-form and the unoxidized l-form.

6. Process for splitting racemates of d,l-steroids, wherein a d,l-steroid is subjected to the action of dehydrogenating enzymes produced by aerobic cultures of micro-organisms which are capable of introducing a double bond into at least one of the 1:2 and 4:5 positions so as to dehydrogenate only the d-form and separating the resulting dehydrogenated d-form and the non-dehydrogenated l-form.

7. Process for splitting racemates of d,l-steroids, wherein a d,l-steroid is subjected to the action of dehydrogenating enzymes produced by aerobic cultures of micro-organisms which are capable of dehydrogenating at least one of the hydroxyl groups in the 3- and the 17-position, so as to dehydrogenate only the d-form and separating the resulting dehydrogenated d-form and the non-dehydrogenated l-form.

8. Process for splitting racemates of d,l-steroids wherein a d,l-steroid is subjected to the action of oxidizing enzymes produced by aerobic cultures of several micro-organisms in a single operation so as to oxidize only the d-form and separating the resulting oxidized d-form and the unoxidized l-form.

9. Process for splitting racemic pregnane compounds wherein a d,l-pregnane compound is subjected to the action of oxidizing enzymes produced by aerobic cultures of micro-organisms so as to oxidize only the d-form and separating the resulting oxidized d-form and the unoxidized l-form.

10. Process for splitting racemates of d,l-steroids wherein a member selected from the group consisting of d,l-progesterone, d,l-cortexone, d,l-cortisone, d,l-$\Delta^4$-3:20-dioxo-11β-hydroxy-pregnene-18-acid-lactone (18→11) d,l-$\Delta^4$-3:18:20-trioxo-11β-hydroxypregnene and its 18:11-cyclosemiacetal, d,l-$\Delta^4$-3:20-dioxo-11β:18-dihydroxy-pregnene, d,l-aldosterone, d,l-α-oestradiol, d,l-androsterone, d,l-19-nor-progesterone, d,l-9α-fluor-11β-hydroxy-progesterone, d,l-17α-hydroxy-cortexone, d,l-17α-hydroxy-corticosterone, d,l-17α-hydroxy-corticosterone-trimethyl acetate and d,l-pregnenolone is subjected to the action of oxidizing enzymes produced by aerobic cultures of micro-organisms so as to oxidize only the d-form and separating the resulting oxidized d-form and the unoxidized l-form.

11. Process for splitting racemic compounds wherein the d,l(18→11β)-lactone of $\Delta^4$-3:20-dioxo-11β-hydroxy-pregnene-18-acid is subjected to the action of oxidizing enzymes produced by aerobic cultures of fungi of the species *Wojnowicia graminis* so as to oxidize only the d-form and separating the resulting d-(18→11β)-lactone of $\Delta^4$-3:20-dioxo-11β,21-dihydroxy-pregnene-18-acid and the unaltered l-(18→11β)-lactone of $\Delta^4$-3:20-dioxo-11β-hydroxy-pregnene-18-acid.

12. Process for splitting racemic pregnane compounds wherein the d:l-18:11-cyclosemi-acetal of 3:18:20-trioxo-11β-hydroxy-pregnene is subjected to the action of oxidizing enzymes produced by aerobic cultures of fungi of the species *Ophiobolus herpotrichus* so as to oxidize only the d-form and separating off the resulting d-aldosterone.

References Cited in the file of this patent

UNITED STATES PATENTS

| | | |
|---|---|---|
| 2,511,867 | Neuberg | June 20, 1950 |
| 2,602,769 | Murray | July 8, 1952 |
| 2,616,828 | Levintow | Nov. 4, 1952 |
| 2,658,023 | Shull | Nov. 3, 1953 |

OTHER REFERENCES

Karrer: Organic Chemistry, 4th English edition, Elsevier Publ. Co., Inc., 1950, page 103.

UNITED STATES PATENT OFFICE

Certificate of Correction

Patent No. 2,844,513 July 22, 1958

Albert Wettstein et al.

It is hereby certified that error appears in the printed specification of the above numbered patent requiring correction and that the said Letters Patent should read as corrected below.

Column 10, line 19, for "actate" read —acetate—; line 66, before "10.62μ," insert —10.22μ,—; column 11, line 49, for "milligram" read —milligrams—; column 12, line 50, for "d-l" read —d,l—; column 12, line 57, after "7" insert —α—; column 13, line 69, strike out "at least one of the positions 6, 7, 11, 15 and 16 so as to" and insert instead —zymes produced by aerobic cultures of micro-organisms so—.

Signed and sealed this 16th day of December 1958.

[SEAL]

Attest:

KARL H. AXLINE,
*Attesting Officer.*

ROBERT C. WATSON,
*Commissioner of Patents.*